(No Model.) 4 Sheets—Sheet 1.

W. H. H. JOHNSON.
AUTOMATIC HAY PRESS FEEDER.

No. 521,657. Patented June 19, 1894.

WITNESSES:
Chas. Nida.
C. Sedgwick.

INVENTOR
W. H. H. Johnson
BY Munn & Co.
ATTORNEYS.

(No Model.)  4 Sheets—Sheet 2.

W. H. H. JOHNSON.
AUTOMATIC HAY PRESS FEEDER.

No. 521,657. Patented June 19, 1894.

WITNESSES:
Chas. Nida
L. Sedgwick

INVENTOR
W. H. H. Johnson
BY
Munn & Co.
ATTORNEYS.

(No Model.)  4 Sheets—Sheet 3.

W. H. H. JOHNSON.
AUTOMATIC HAY PRESS FEEDER.

No. 521,657.  Patented June 19, 1894.

WITNESSES:  INVENTOR
Chas. Niora.  W. H. H. Johnson
C. Sedgwick  BY Munn & Co.
  ATTORNEYS.

(No Model.) 4 Sheets—Sheet 4.
W. H. H. JOHNSON.
AUTOMATIC HAY PRESS FEEDER.
No. 521,657. Patented June 19, 1894.
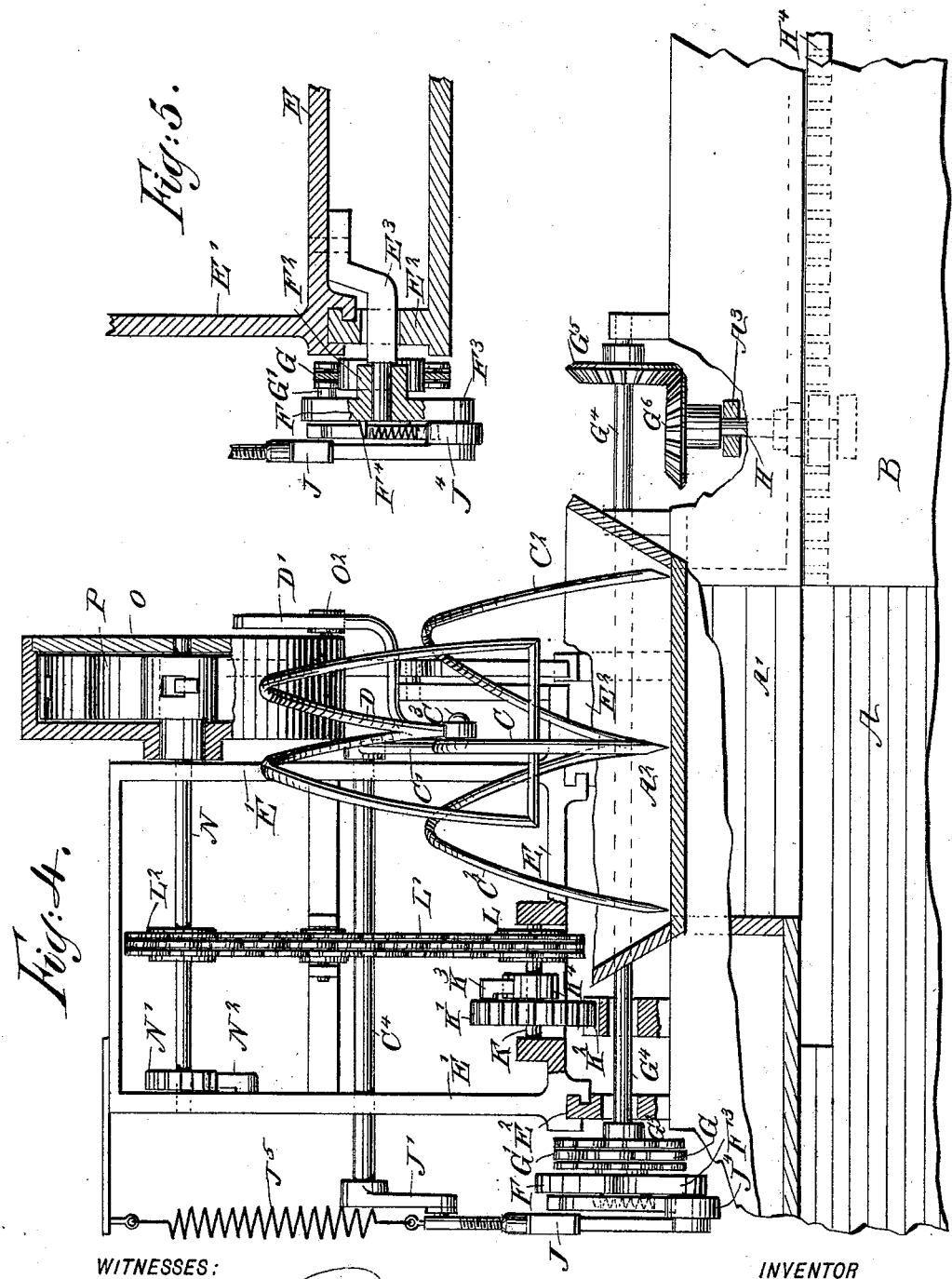
WITNESSES:
Chas. Niela.
C. Sedgwick
INVENTOR
W. H. H. Johnson
BY
Munn & Co.
ATTORNEYS.

UNITED STATES PATENT OFFICE

WILLIAM H. H. JOHNSON, OF LA DUE, MISSOURI.

AUTOMATIC HAY-PRESS FEEDER.

SPECIFICATION forming part of Letters Patent No. 521,657, dated June 19, 1894.

Application filed October 3, 1893. Serial No. 487,071. (No model.)

*To all whom it may concern:*

Be it known that I, WILLIAM H. H. JOHNSON, of La Due, in the county of Henry and State of Missouri, have invented a new and Improved Automatic Hay-Press Feeder, of which the following is a full, clear, and exact description.

The object of the invention is to provide a new and improved hay press feeder which is simple and durable in construction, very effective in operation, and arranged to automatically and continuously feed the material into the plunger box of a hay press, in unison with the movement of the reciprocating plunger in the said box.

The invention consists principally of a rake for raking the hay into the plunger box feed hopper, and a feeder bar pivoted on the said rake and adapted to press the hay down the feed hopper into the plunger box in advance of the reciprocating plunger.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
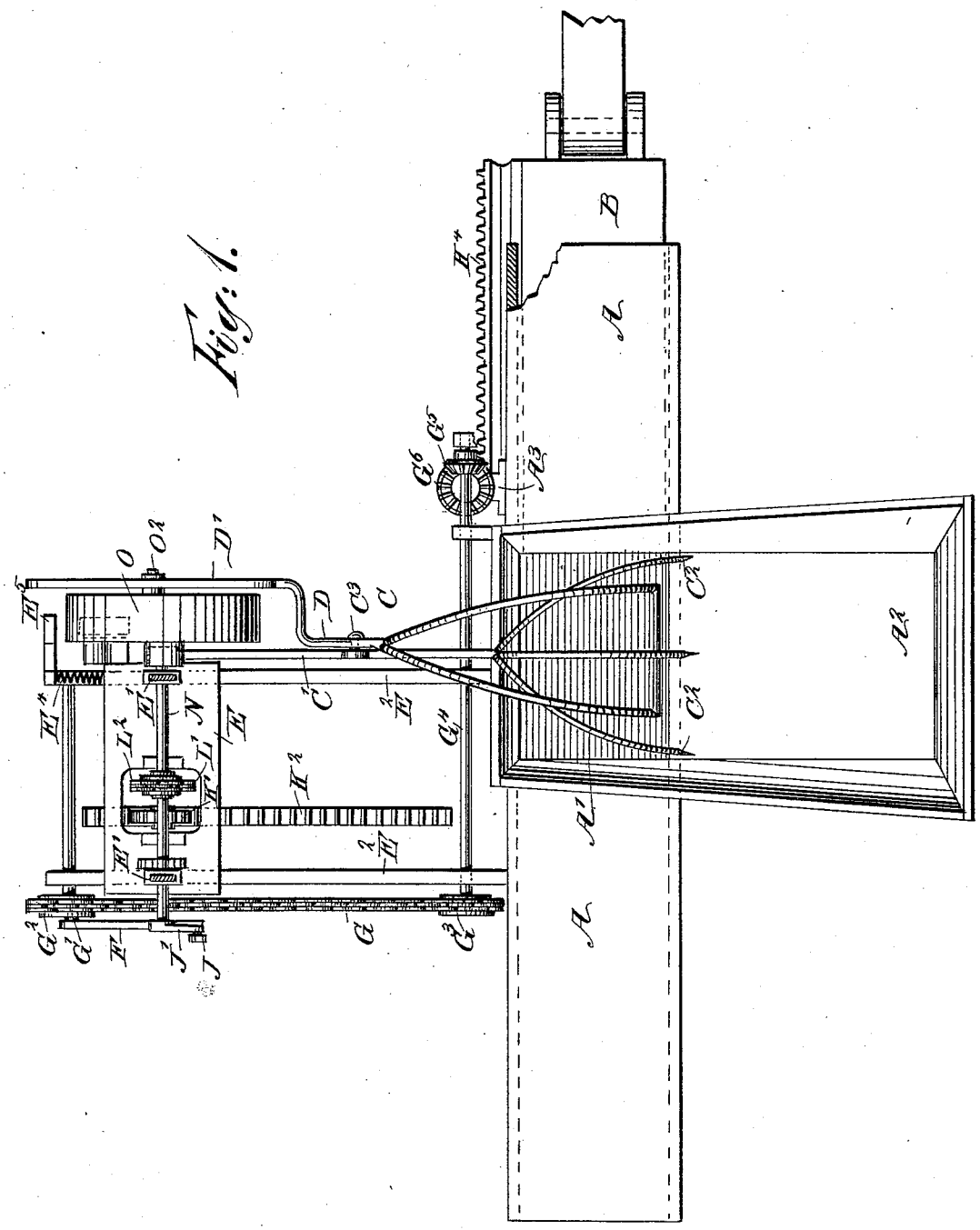
Figure 2:
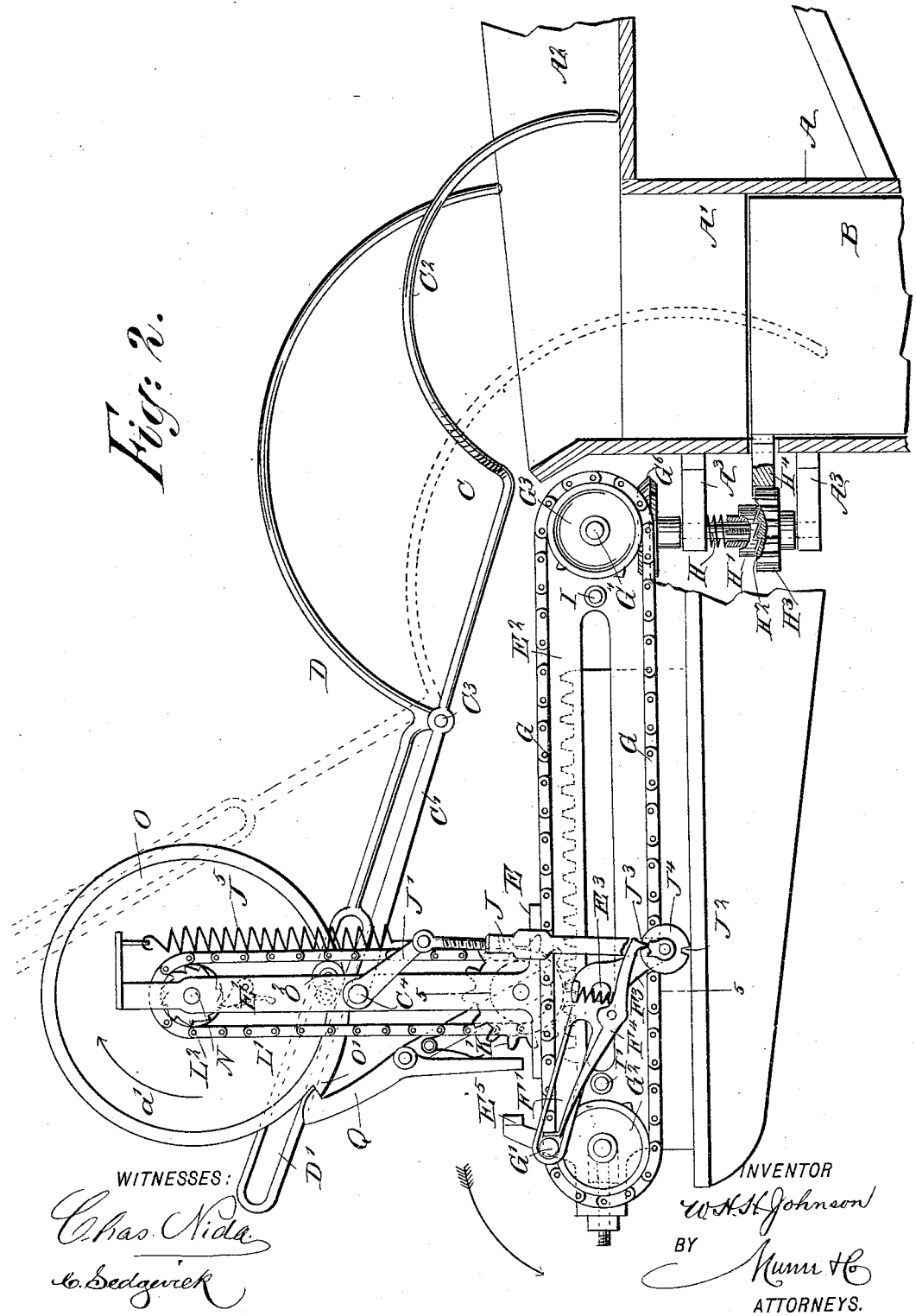
Figure 3:
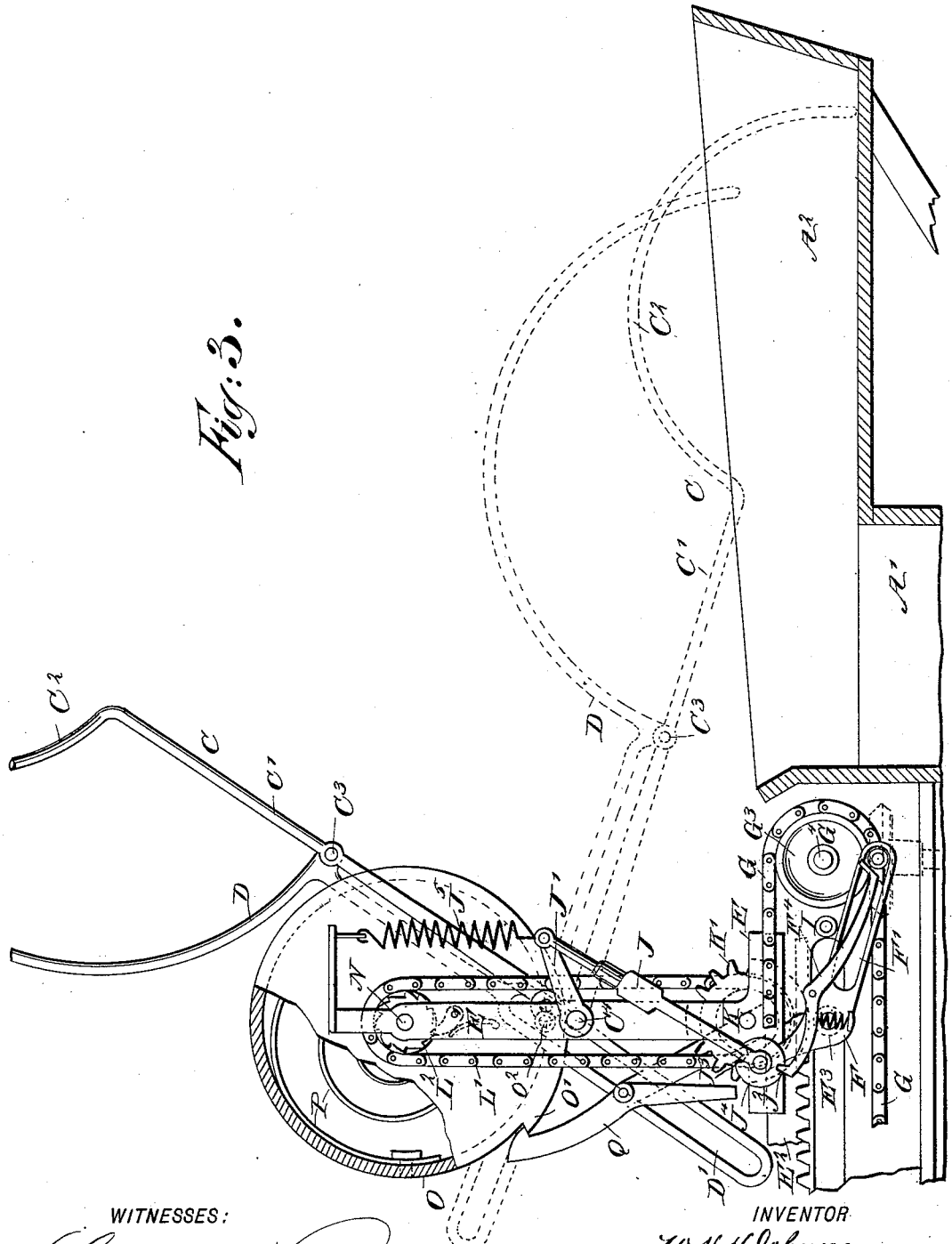

Figure 1 is a plan view of the improvement. Fig. 2 is an enlarged side elevation of the same with parts in section. Fig. 3 is a similar view of the same with parts in a different position. Fig. 4 is a front view of the same with parts in section; and Fig. 5 is an enlarged transverse section of part of the improvement on the line 5—5 of Fig. 2.

The improved feeder is adapted to be used on a hay press of any approved construction and provided with the usual plunger box A, into which discharges the feed hopper A', connected at one side with the feed table $A^2$ onto which the hay is to be moved into the hopper A' to be pressed down therein and into the plunger box A in advance of the plunger B mounted to reciprocate in the said plunger box. The material is moved from the feed table $A^2$ into the hopper A' by a rake C having a shank C' and curved rake fingers $C^2$, as illustrated in the drawings. At $C^3$ on the shank C' is pivoted a feed bar D, adapted to press the hay moved into the hopper A' by the rake C down into the plunger box A in front of the plunger B, the said rake and feed bar operating in unison with the said plunger and being actuated from the same. The rear end of the shank C' of the rake C is secured on the inner end of a transversely-extending shaft $C^4$ journaled in suitable bearings arranged on the standards E' erected on a carriage E mounted to slide forward and backward on suitable guideways $E^2$ supported from one side of the plunger box A on the opposite side of the feed table $A^2$. The carriage E receives a full forward and backward movement on the forward stroke of the plunger B, while on the return stroke of the latter the said carriage is at a standstill.

In order to actuate the carriage E from the plunger B, the following device is provided: From the carriage E extends to one side a stud $E^3$ (see detail Fig. 5), on which is mounted to swing a lever arm F, formed near its free end with an elongated slot F', engaged by a friction roller G', held on one of the links of an endless sprocket chain G passing over sprocket wheels $G^2$ and $G^3$, mounted on shafts journaled in suitable bearings held on the guideways $E^2$ and box A. The shaft $G^4$ carrying the sprocket wheel $G^3$ extends parallel to the rear side of the plunger box A, and it is provided with a bevel pinion $G^5$ in mesh with a bevel gear wheel $G^6$, mounted to rotate loosely on a short vertically disposed shaft H, revolving in suitable bearings arranged on brackets $A^3$ secured to the top of the plunger box A, as is plainly shown in Fig. 2. On the shaft H is mounted to turn and to slide a spring pressed clutch H', in mesh with clutch teeth $H^2$ formed on the upper face of a gear wheel $H^3$ mounted to rotate loosely on the shaft H and in mesh with a rack $H^4$ fastened to the rear side of the plunger B as plainly shown in Figs. 1 and 2. Now on the forward movement of the plunger B the rack $H^4$ rotates the gear wheel $H^3$ connected by the clutch teeth $H^2$ with clutch H' so that the shaft H is rotated. On the return movement of the plunger B the shaft H remains still as the clutch teeth $H^2$ of the revolving gear wheel $H^3$ glide over the teeth of clutch H'. The gears are so arranged that when the plunger B makes a full forward stroke the shaft G⁴ is turned six times to cause the chain G to travel around once to impart a complete forward and backward movement to the carriage E. One of the guideways E² supports on its front side the friction rollers I I' extending into the path of the hub F² of the lever arm F to be alternately engaged by the hub F² to hold the carriage in place as the arm moves up and down. The outward movement of the carriage E is limited by a buffer spring E⁴, shown in Fig. 1, the said buffer spring also serving to permit the carriage to gather its momentum for starting on the return movement. The lever arm F, is permitted to swing on its stud E³ until the friction roller G' carried by the chain G has passed around the sprocket wheel G², it being understood that the movement of the latter is not interrupted by the stopping of the carriage E. The carriage E thus remains stationary until the roller G' has passed from its uppermost position into a lowermost position and has moved forward a suitable distance with the lower strand of the chain G, until finally the said friction roller G' again exerts a pull on the lever arm F in an inward direction, so as to start the carriage E on its return trip toward the plunger box A. When the carriage has compressed the buffer spring E⁴, then a further inward sliding movement of the carriage E is prevented, the lever arm F then swinging around with the movement of the friction roller G' until it finally assumes an upward position on the upper strand of the chain G and it again exerts a pull outward on the carriage E. Thus it will be seen that the carriage E receives an intermittent forward and backward sliding motion on each forward stroke of the plunger B, and a turning motion is given to the hub F² of the said lever arm F at the time the friction roller G' passes around the wheels G² and G³. This motion is necessary to impart a swinging motion to the rake C to lift the same off the feed table A² on the inward stroke of the carriage E, and to bring it down upon the feed table on the outward stroke of the said carriage, as above described. In order to accomplish this movement the following connection is made between the lever arm F and the shaft C⁴ carrying the shank C' of the rake C: On the hub F² is formed an extension arm F³, pivotally connected by an adjustable link J with a crank arm J' secured on the said shaft C⁴. Thus when the arm F is turned by the rollers G' passing over wheel G² the link J moves in an upward direction to cause a like upward swinging motion of the crank arm J', so that the shaft C⁴ is turned in its bearings and the fingers C² of the rake C are lifted off of the feed table A². This position of the rake C is retained during the return or inward movement of the carriage E, and the swinging arm F permits a return or downward movement of the rake fingers C² which engage the latter with the outer end of the feed table A², at the time the roller G' passes over the sprocket wheel G³.

In order to prevent accidental displacement of the lever arm F, I provide the latter with a spring pressed pawl F⁴ adapted to alternately engage notches J² and J³ formed opposite each other in the periphery of a disk J⁴ attached to the lower end of the link J (see Figs. 2 and 5). Thus, during the outward movement of the carriage E, the said spring pressed pawl F⁴ is in engagement with the notch J², and on the return movement of the carriage the pawl is in engagement with the notch J³, see Figs. 2 and 3. A spring J⁵ pulls on the upper end of the link J to insure a proper and quick upward movement of the same and assist in raising and lowering the rake C held on the shaft C⁴ with which the link J is connected by the arm J'. It is understood that when the lever arm F swings around at the time the friction roller G' passes over the wheels G² and G³, then the pawl F⁴ is pulled out of engagement with the respective notches, and when the arm is again pulled forward in either direction, then the said pawl F⁴ is again in engagement with the respective notch.

During the outward movement of the carriage E, the rake fingers C² are in contact with the feed table A², to move the hay or other substance into the hopper A', but on the return movement of the said carriage E, the rake is held in an uppermost position with the fingers C² above the said table, as above described and illustrated in Fig. 3. During the time the rake C is lifted off the feed table the latter is filled with hay or other substance, to be taken hold of again by the said rake on the next outward movement of the carriage E.

In order to impart movement to the feed bar D from the carriage E actuated from the plunger B, as above described, the following device is provided: On the carriage E is journaled a transversely-extending shaft K, on which is mounted to rotate loosely a gear wheel K', in mesh with a fixed rack K², supported on the framework carrying the guideway E². On the inner face of the gear wheel K' is held a spring pressed pawl K³ in mesh with a ratchet wheel K⁴ secured on the said shaft K. Thus, when the carriage E moves inward the gear wheel K' rolls off on the rack K² and, by its pawl K³, rotates the ratchet wheel K⁴ and consequently the shaft K. On the return stroke of the carriage E the said gear wheel K' does not transmit its motion to the ratchet wheel K⁴ and shaft K as the pawl K³ rides over the teeth of the said ratchet wheel K⁴. This intermittent rotary movement of the shaft K serves to wind up a spring, and for this purpose I fasten on the shaft K a sprocket wheel L connected by a sprocket chain L' with a sprocket wheel L² fastened on a transversely-extending shaft N journaled in the upper ends of the standards E'.

On the shaft N is mounted to rotate loosely a spring barrel O containing a spring P fastened by its inner end on the said shaft N and by its outer end on the inner surface of the rim of the spring barrel O, as illustrated in Fig. 4. Thus, when the shaft N is turned by the intermittent movement of the shaft K the spring P is wound up, it being understood that during this operation the spring barrel O is locked in position by a spring-pressed tripping pawl Q, engaging with its hooked end a shoulder O' formed on the periphery of the said spring barrel. This tripping pawl Q is fulcrumed on a bracket projecting from the carriage E, and the lower end of the said pawl is adapted to engage a lug E⁵ fixed near the outer end of one of the guideways E², as will be readily understood by reference to Figs. 1 and 2. On the rear face of the spring barrel O is arranged a pin O², engaging a slotted extension D' of the feed bar D, the said pin imparting a swinging motion to the said feed bar D at the time the spring barrel O rotates, this movement being caused by the uncoiling of its spring P at the time the tripping pawl Q has disengaged the shoulder O', which movement takes place at the time the carriage E moves into an outermost position and moves the lower end of the said tripping pawl in contact with the fixed projection or lug E⁵.

In order to hold the shaft N stationary during the time the spring P is uncoiled after its barrel has been tripped or released by the pawl Q, I provide the said shaft N with a ratchet wheel N' engaged by a spring pressed pawl N² fulcrumed on one of the standards E', see Fig. 4.

The operation is as follows: When the several parts are in the position shown in Fig. 3, then the plunger B is about finishing the compression of the hay in the plunger box A. During this last compression period of the plunger B, the friction roller G' moves into an uppermost position over the sprocket wheel G⁸, to permit the link J' to slide downward to its angular position, see Fig. 2, whereby the rake C is caused to swing downward to bring the rake fingers in contact with the outer end of the feed table A², and in contact with the hay or other substance which has accumulated on the said feed table. During the return stroke of the plunger B the several parts of the feeder remain stationary as above described, and when the plunger is again on its forward movement the feeder is actuated by the mechanism above described and connected with the plunger B. The friction roller G' now exerts a pull on the lever arm F, to move the carriage E outward, thus carrying the rake C along, whereby the hay taken hold of by the rake fingers C is drawn over the feed table A² into the hopper A'. During the inward movement of the carriage E the shafts K and N are revolved by the mechanism above described so that the spring P is wound up, and when finally the carriage moves into an outermost position the pawl Q strikes the fixed lug E⁵ and thus releases the spring barrel O to permit the spring P to uncoil, thus rotating the said spring barrel in the direction of the arrow $a'$. This revolving of the spring barrel O causes the pin O² to impart a swinging motion to the slotted extension D' of the feed bar D, so that the forward end of the latter is moved downward upon the hay in the hopper N' to press the hay from the said hopper into the plunger box in front of the advancing plunger B. This movement is very quick and is accomplished during one-half of the revolution of the spring barrel O, the last half of the revolution causing a return or upward swinging of the feed bar D to move the latter out of the hopper A' and back into its normal position, shown in Fig. 3. At the time the spring barrel O completes its revolution, the carriage E is moving inward, so that the pawl Q strikes the lug E⁵ and the spring of the said pawl returns the latter to its normal position, that is the hook end of the pawl again engages the shoulder O' of the spring barrel at the time the latter finishes its complete revolution.

It is understood that at the time the feed bar D presses the hay from the hopper A' into the plunger box A the rake fingers C² extend over the mouth of the said hopper, the said feed bar passing between the rake fingers, as illustrated in Figs. 1 and 4. Thus, the forward and backward movement of the feed bar D is with the rake C on which it is pivoted, but the downward and upward movement of the said feed bar in the hopper A is caused by the spring barrel O.

Having thus fully described my invention, I claim as new and desire to secure by Letters Patent—

1. A press feeder of the class described, comprising a rake for raking the hay into the plunger box feed hopper, and a feed bar pivoted on the said rake and adapted to press the hay down the feed hopper into the plunger box in advance of the plunger, substantially as shown and described.

2. A press feeder of the class described, comprising a rake for raking the hay into the plunger box feed hopper a plunger, a feed bar pivoted on the said rake and adapted to press the hay down the feed hopper into the plunger box in advance of the plunger, a spring barrel for imparting a swinging motion to the said feed bar to move the latter into and out of the said feed hopper, and means for connecting the spring barrel with the feed-bar, substantially as shown and described.

3. A press feeder of the class described, comprising a rake for raking the hay into the plunger box feed hopper a plunger, a feed bar pivoted on the said rake and adapted to press the hay down the feed hopper into the plunger box in advance of the plunger, and mechanism, substantially as described, for imparting a reciprocating motion to the said rake and the feed bar carried thereon, the said mechanism being actuated from the plunger of the press, substantially as set forth.

4. A press feeder of the class described, comprising a plunger an endless chain adapted to receive an intermittent movement from the plunger, a slotted lever arm engaging a friction roller on the said chain, a carriage on which the said lever arm is pivoted, and a rake carried by the said carriage and moving with the same, substantially as shown and described.

5. A press feeder of the class described, comprising a plunger an endless chain adapted to receive an intermittent movement from the plunger, a slotted lever arm engaging a friction roller on the said chain, a carriage on which the said lever arm is pivoted, a rake carried by the said carriage and moving with the same, and stops for limiting the traveling motion of the said carriage, as set forth.

6. A press feeder of the class described, comprising a plunger an endless chain adapted to receive an intermittent movement from the plunger, a slotted lever arm engaging a friction roller on the said chain, a carriage on which the said lever arm is pivoted, a rake carried by the said carriage and moving with the same, a pawl held on the said lever arm, a notched disk held on said arm and engaged by the said pawl, and a crank arm connected with the said slotted lever arm and fastened on a shaft carrying the rake, the said shaft being journaled in the said carriage, substantially as shown and described.

7. A press feeder of the class described, comprising a plunger, an endless chain adapted to receive an intermittent movement from the plunger, a slotted lever arm engaging a friction roller on the said chain, a carriage on which the said lever arm is pivoted, a rake carried by the said carriage and moving with the same, a pawl held on the said lever arm, a notched disk held on said lever arm and engaged by the said pawl, a crank arm connected by an adjustable link with the said slotted lever arm, a shaft carrying the said crank arm and journaled in the said carriage, and a rake secured on the said shaft, substantially as shown and described.

8. A press feeder of the class described, comprising a plunger, an endless chain adapted to receive an intermittent movement from the plunger, a slotted lever arm engaging a friction roller on the said chain, a carriage on which the said lever arm is pivoted, a rake carried by the said carriage and moving with the same, a pawl held on the said lever arm, a notched disk held on said lever arm and engaged by the said pawl, a crank arm connected by an adjustable link with the said lever arm, a shaft carrying the said crank arm and journaled in the said carriage, a rake secured on the said shaft, a feed bar pivoted on the said rake and having a slotted extension, and a spring barrel carrying a pin engaging the said slotted extension, substantially as shown and described.

9. In a press feeder, the combination with a plunger and traveling chain carrying a friction roller, of a slotted lever arm pivoted on a fixed stud and engaged by said roller, the link J, a crank and rake arranged as specified, a stud on the lower end of said link, a notched disk mounted on said stud and a spring-pressed pawl fulcrumed on the lever arm and engaging the said disk, substantially as shown and described.

10. A press feeder of the class described, comprising a carriage having an intermittent sliding movement, a fixed rack under the said carriage, a gear wheel in mesh with the said fixed rack and mounted to rotate loosely on a shaft journaled in the said carriage, a ratchet and pawl mechanism connecting the said gear wheel with the said shaft, a second shaft journaled on the said carriage and adapted to be driven from the said first named shaft, a spring barrel mounted loosely on the said shaft, a spring within the said barrel and attached at one end to the said shaft and at its other end to the said barrel, a spring-pressed tripping pawl adapted to engage a shoulder on the said barrel and adapted to strike a fixed lug, the said pawl being pivoted on the said carriage, and a pin carried by the said barrel and engaging a slotted extension of the feeder bar, substantially as shown and described.

WILLIAM H. H. JOHNSON.

Witnesses:
JAMES B. ARNOLD,
HARRY KEMP.